(12) United States Patent
Pfeiffer

(10) Patent No.: US 6,641,352 B2
(45) Date of Patent: Nov. 4, 2003

(54) ADJUSTABLE FLOW TRACK SYSTEM

(76) Inventor: Harold Pfeiffer, 17 Bobwhite Ct., Forked River, NJ (US) 08731

( * ) Notice: Subject to any disclaimer, the term of this patent is extended or adjusted under 35 U.S.C. 154(b) by 0 days.

(21) Appl. No.: 10/293,870

(22) Filed: Nov. 13, 2002

(65) Prior Publication Data

US 2003/0121751 A1 Jul. 3, 2003

Related U.S. Application Data

(60) Provisional application No. 60/335,901, filed on Nov. 15, 2001.

(51) Int. Cl.[7] ................................................ B65G 1/00
(52) U.S. Cl. ..................... 414/276; 193/35 A; 193/35 R
(58) Field of Search ............................. 193/35 A, 35 R; 414/276, 527

(56) References Cited

U.S. PATENT DOCUMENTS

| | | | | |
|---|---|---|---|---|
| 3,458,023 A | * | 7/1969 | Kramer, III et al. | 193/35 R |
| 4,119,190 A | * | 10/1978 | Kornylak | 193/35 A |
| 4,168,780 A | * | 9/1979 | Parrott | 211/151 |
| 4,182,440 A | * | 1/1980 | Juergens | 193/35 A |
| 4,212,381 A | * | 7/1980 | Cook | 193/32 |
| 4,239,099 A | * | 12/1980 | Williams et al. | 193/32 |
| 6,102,185 A | | 8/2000 | Neuwirth et al. | |
| 6,132,158 A | | 10/2000 | Pfeiffer et al. | |
| 6,431,808 B1 | * | 8/2002 | Lowrey et al. | 414/276 |
| 6,497,326 B1 | * | 12/2002 | Osawa | 211/59.2 |
| 6,523,664 B2 | * | 2/2003 | Shaw et al. | 193/35 R |

* cited by examiner

Primary Examiner—Christopher P. Ellis
Assistant Examiner—Richard Ridley
(74) Attorney, Agent, or Firm—Clifford G. Frayne

(57) ABSTRACT

A flow track system comprising a plurality of flow track members, each flow track member comprised of generally parallel, spaced apart support members having a plurality of axles transversely disposed therebetween, the axles having mounted thereon a plurality of free turning rollers, the support members having an impact feed plate mounted at a first end and a discharge stop plate mounted at a second end, the feed plate and discharge plates having a sleeve formed therein for slidable, rotatable engagement with a securing bolt and having formed on each end thereof a plurality of engagement stops to selectively set the distance that the in feed plate and the discharge plate extend beyond the ends of the parallel, spaced apart support members allowing for the adjustment of fit between the pallet beams. The weight of the track locks the in feed plate and the discharge plate position.

6 Claims, 2 Drawing Sheets

ADJUSTABLE FLOW TRACK SYSTEM

RELATED APPLICATION

Applicant claims the benefit of Provisional Application Serial No. 60/335,901, filed Nov. 15, 2001.

BACKGROUND OF THE INVENTION

1. Field of the Invention

The present invention relates.to warehouse storage apparatus and more particularly to a modular flow track that provides for ease of assembly to tiers of pallet rack assemblies and makes possible easy access to store containers disposed upon such pallet racks, the flow deck being adjustable in length without the need for tools.

2. Description of the Prior Art.

The storage of containers, boxes, and other storage items has always presented the warehouse engineer with difficult choices. One objective of the warehouse engineer is to store as many items as possible in a given storage space while still being able to provide normal and efficient access thereto. The problem with high density storage design is that the shortening of the height of the tiers of adjacent pallet racks provides classification of materials within a given floor space at the expense of severely restricting access to the containers disposed upon the racks.

It is not uncommon to find that material handling personnel are often thwarted in their attempts to access containers disposed behind other containers in a row of containers stored on a given pallet rack tier.

In recent times, flow tracks have become popular as a means of loading and unloading containers on pallet racks. These flow tracks allow materials to move easily over the rollers of the tracks, thus making it convenient to load and unload containers. However, it is still a requirement of accessability that these pallet rack tiers be spaced a minimum height distance in order to allow for ease of flow and for proper handling.

One of the early disadvantages with the use of flow tracking was that the tracks had to be bolted to the pallet frames for support. This is both a laborious set up, an inconvenience, and a waste of tier height space. The height of the flow tracks themselves increased overall height of the storage tiers. The addition of only a few inches to each tier eliminates a whole tier after only approximately five tiers have been constructed.

The attachment problem was solved with the development of a flow track with an extremely low profile. This type of flow track required no mechanical attachment to the pallet rack beams and added minimal overall height to each tier. See U.S. Pat. No. 6,102,185 to Neuwirth and the Applicant herein, and U.S. Pat. No. 6,132,158 to Pfeiffer, the Applicant herein, and Neuwirth, for an explanation of the low profile flow track.

Applicant has improved upon the low profile concept of the flow track by providing a flow track in which the end plates are adjustable without tools so as to allow the hand adjustment of the overall length of the flow track depending upon the configuration of the pallet rack support frames.

OBJECTS OF THE INVENTION

An object of the present invention is to provide for a novel flow track system that can be drop loaded into a pallet storage tier.

A further object of the present invention is to provide for a novel flow track system having a low profile substantially flush mounted with the support beam of a storage tier.

A still further object of the present invention is to provide for a novel flow track system, the flow tracks of which can be adjusted in length without the use of tools.

A still further object of the present invention is to provide for a novel flow track system which is inexpensive and can be adapted to most any storage frame.

SUMMARY OF THE INVENTION

A flow track system comprising a plurality of flow track members, each flow track member comprised of generally parallel, spaced apart support members having a plurality of axles transversely disposed therebetween, the axles having mounted thereon a plurality of free turning rollers, the support members having an impact feed plate mounted at a first end and a discharge stop plate mounted at a second end, the feed plate and discharge plates having a sleeve formed therein for slidable, rotatable engagement with a securing bolt and having formed on each end thereof a plurality of engagement stops to selectively set the distance that the in feed plate and the discharge plate extend beyond the ends of the parallel, spaced apart support members allowing for the adjustment of fit between the pallet beams. The weight of the track locks the in feed plate and the discharge plate position.

BRIEF DESCRIPTION OF THE DRAWINGS

These and other objects of the present invention will become evident particularly when taken in light of the following illustrations wherein.

DETAILED DESCRIPTION OF THE DRAWINGS

Figure 1:
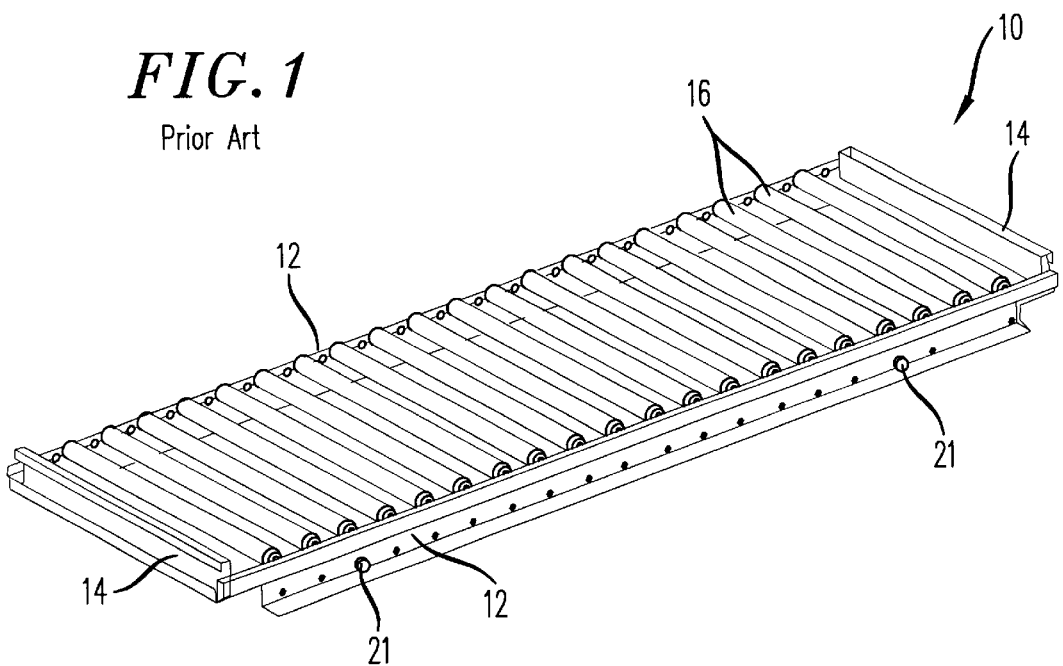
FIG. 1 is a perspective view of a typical flow track as currently used.

Referring to FIG. 1 there is illustrated a perspective view of a low profile flow track 10. Flow track 10 comprises a frame having two parallel; spaced apart side rails 12, and a pair of distally disposed end plates 14. A plurality of rotatably affixed rollers 16 are spaced along and secured for rotation within the side rails 12 on a plurality of axles 13 (not shown). The side rails 12 are bolted together by spanning rods 21.

Figure 2:
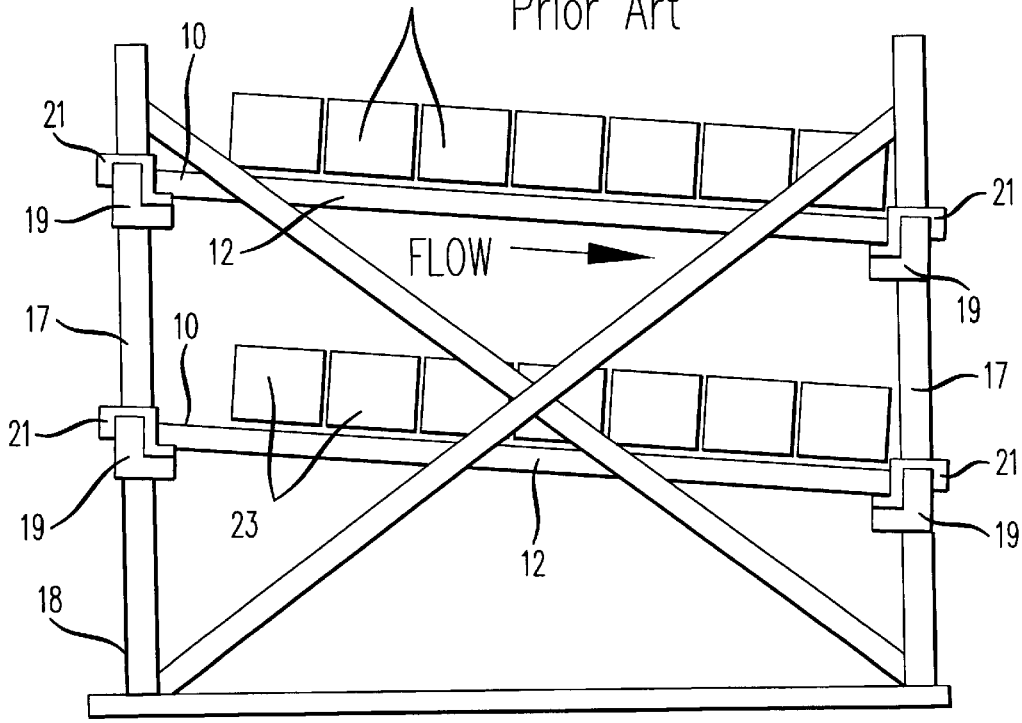
FIG. 2 is a side view of a typical flow track system and pallet beam support from a side view.

A plurality of flow tracks 10 would be installed on a pallet rack tier 18. The tier 18 comprises vertical frame post 17 that support horizontal beams 19. In the configuration of FIG. 2, the flow track 10 drops upon bracket hangers 21 which overlap the support beams 19 and requires no mechanical attachment thereto.

The pallet rack tier 18 would be the fabricated and constructed based upon the configuration of the warehouse space, the type of product 23 that would be stored on the pallet rack tier and the manner of ingress and egress to the rear of the pallet rack tier for loading and the front of the pallet rack tier for unloading.

In the prior art, the flow track 10 would have either fixed hooks at the load and discharge end to engage the horizontal beams 19, or hanger members were used to seat on the horizontal beams 19 and support the flow track 10 in a low profile.

Applicant's present invention has an impact plate feed end and a raised stop discharge end of the flow track which allows for the adjustment in length of the flow track, the feed end impact plate and discharge stop plate are formed to provide surfaces which directly engage the horizontal beams 19 of a pallet rack tier 18.

Figure 3:
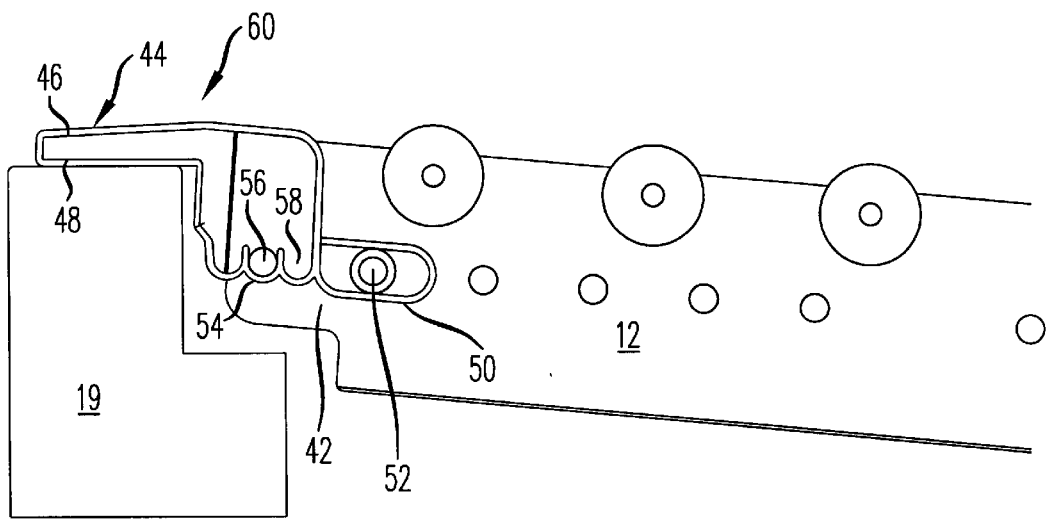
FIG. 3 is a side view of the feed end of the flow track system of the present invention.

FIG. 3 is a side view of the feed end of the flow track 10 of the present invention. The flow track 10 has mounted in a slidably, rotatable manner on opposing rails 12, an impact feed plate member 40 which is cooperative with the horizontal beam 19 to position the flow track. The slide feed plate member 40 has a mounting and support portion 42 mounted to the sides of rails 12 and a horizontal beam engaging portion 44 which spans the width of the flow track 10 from opposing rails 12 and has an upper generally planar surface 46 and a lower generally planar surface 48 which actually rests on the top of the horizontal beam 19.

The mounting and support portion 42 comprises a slotted finger 50 which is rotatably slidably mounted on the transverse end securing bolt 52 which extends outwardly from rails 12. Slide feed member 40 may be rotated and simultaneously slid about the opposing transverse ends of securing bolt 52.

Cooperative with slot portion 50, there is also a secondary support portion 54 which comprises a cross bolt 56 proximate the end of rail 12 on both opposing rails 12 and a plurality of engaging slots 58 for selective engagement with cross bolt 56.

In this configuration, the impact feed plate 40 can be adjusted to provide for varying lengths of the flow track 10. If the impact feed plate 40 is rotated downwardly about securing bolt 52 and forwardly about securing bolt 52 and the cross bolt 56 engages the rear most engaging slot 54, and the flow track 10 is dropped into position, the flow track finds itself at its greater length at the feed end. Rotating downwardly and sliding rearwardly and engaging the forward engagement slot 54, the flow track would find itself at its shortest feeding length.

Figure 4:
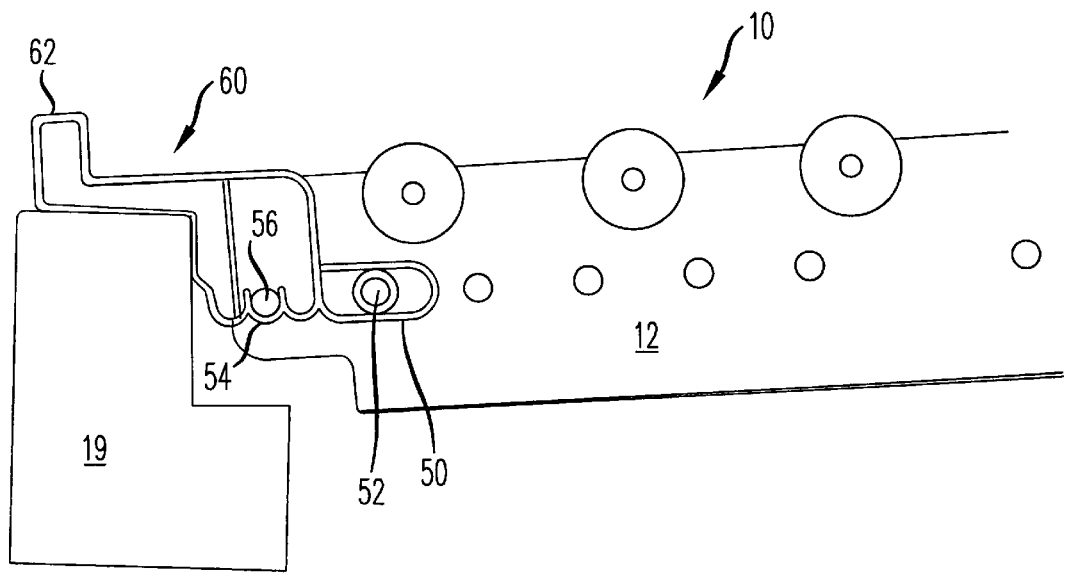
FIG. 4 is a side view of the discharge end of the flow track system of the present invention.

FIG. 4 is a side view of the discharge stop plate 60, flow track 10 and horizontal beam 19. The discharge stop plate 60 operates identically with respect to the discharge end as the feed slide plate operates with respect to the feed end of the flow track. The only exception is that the discharge slide plate 60 is formed with an upstanding flange 62 which serves as a stop for the material 23 which is stored on the flow track.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

I claim:

1. A low profile, horizontal and depth extendable flow track system accommodated to a variety of storage frames and pallet racks, the flow track system comprising:

a flow track conveyer member having elongated side rails, a series of conveying elements disposed between and spaced along said elongated side rails, said elongated side rails having mounted on one distal end, a feed plate member, said feed plate member slidably rotatable about a first mounting means and lockingly engageable with a second mounting means in cooperation with a multi-positional slot well for selectively engaging said second mounting means, said feed plate member having a frame engaging member spanning between said elongated side rails;

a discharge plate member slidably rotatable about a first mounting member and lockingly engageable with a second mounting means in cooperation with a multi-positional slot well for selectively engaging said second mounting means on an opposing distal end of said flow track conveyer member, said discharge plate member having a frame engaging member spanning between said elongated side rails, said frame engaging member having an upstanding stop member spanning between said side rails, said feed plate member and said discharge plate member respectively supporting said flow track therebetween by virtue of said respective frame engaging members in cooperation with end support beams distally disposed on a storage frame, thus providing depth extendibility to said flow track.

2. The flow track system in accordance with claim 1 wherein said series of conveyer elements of said flow track conveyer member further comprises a plurality of rollers substantially evenly spaced along said elongated side rails and rotatively supported thereby.

3. The flow track system in accordance with claim 1 wherein said flow track conveyer member is structurally supported by said feed plate member and said discharge plate member.

4. The flow track system in accordance with claim 1 wherein said first mounting means in said second mounting means on said feed plate member end and said discharge plate member end comprises a rod spanning said elongated side rails and extending outwardly therefrom.

5. The flow track system in accordance with claim 1 wherein said first mounting means associated with said feed plate member and said discharge plate member is engageable within a slot formed on said feed plate member and said discharge plate member allowing said feed plate member and said discharge plate member the slidability with respect to the ends of said elongated side rails and rotatability about said first mounting means.

6. The flow track system in accordance with claim 1 wherein said second mounting means associated with said feed plate member and said discharge plate member is selectively slidably engageable within one of a plurality of U-shaped slots formed on said feed plate member and said discharge plate member in response to the slidability and rotatability of said respective feed plate member and discharge plate member respecting said first mounting means.

* * * * *